Figure 1:
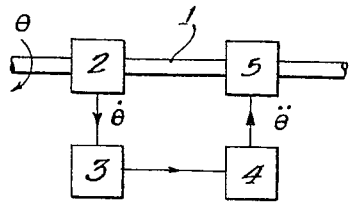

Oct. 11, 1966          N. F. HECTOR ETAL                3,277,727
           DEVICE FOR GENERATING ARTIFICIAL MOMENT OF INERTIA
                    IN A ROTATABLY ARRANGED SYSTEM
                        Filed April 7, 1960

Inventors:
N. F. Hector
K-J Åström
By W. Bayard Jones
Attorney

United States Patent Office 3,277,727
Patented Oct. 11, 1966

3,277,727
DEVICE FOR GENERATING ARTIFICIAL MOMENT OF INERTIA IN A ROTATABLY ARRANGED SYSTEM
Nils Folke Hector and Karl-Johan Astrom, Stockholm, Sweden, assignors to Svenska Aktiebolaget Philips, Stockholm, Sweden, a joint-stock company of Sweden
Filed Apr. 7, 1960, Ser. No. 20,753
Claims priority, application Sweden, Apr. 9, 1959, 3,394/59; Sept. 24, 1959, 8,920/59
11 Claims. (Cl. 74—5.6)

The present invention is designed to produce an artificial moment of inertia in a rotatably arranged system by the introduction of a torque in the system.

The moment of inertia of a rotatably arranged system with reference to its rotation axis is determined by the size and distribution of its mass and by the dimensions of the system in relation to the rotation axis. In many cases it is for various reasons impossible to dimension the system in a way that a certain fixed moment of inertia is obtained. That is, for example, the case with certain kinds of navigation systems, with stabilized platforms of the kind used in fire control equipments, etc., in which very great moments of inertia and small masses and dimensions are demanded.

In accordance with the present invention, a rotatably arranged system is provided with an artificial moment of inertia with the desired magnitude, which can be greater or smaller than the moment of inertia corresponding to its mass and dimensions. This is, according to the invention, obtained by the means that the device includes partly a device for determining the angular acceleration of the rotatable system relative to a space-fixed reference direction and the generation of a magnitude which is proportional to the aforesaid angular acceleration, and partly a device for the introduction of a torque in the rotatable system with a size proportional to the magnitude produced by the acceleration-determining device. The dimensioning of the components of the device, according to the invention, are determined by the desired artificial moment of inertia, which will be evident from the following mathematical analysis.

The device for determining the angular acceleration of the rotatable system relative to a space-fixed reference direction can obviously be achieved in various ways. To facilitate the understanding of the invention, this device can be considered to consist of a tachometer generator on a space-orientated basis with a device for differentiation and possibly amplification of the generator voltage. However, it is more advantageous to use a so-called integrating gyro arranged on the rotatable system, i.e., a gyro with only one degree of freedom, as will be shown in a number of embodiments of the invention described in the following.

Figure 3:
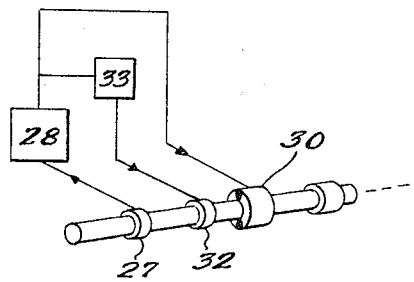
Figure 2:
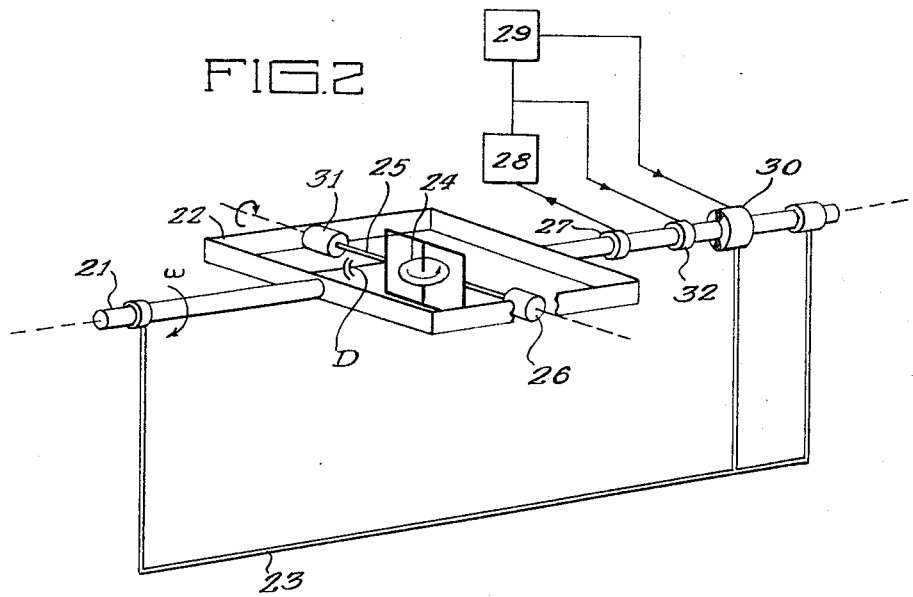
Figure 4:
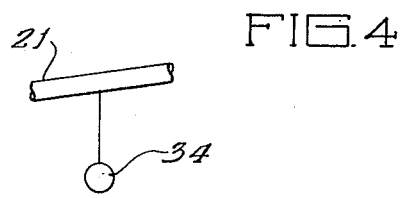

The invention will be more closely explained in the following in connection with the enclosed drawing, in which FIG. 1 shows a diagram of a device in accordance with the invention, in which a tachometer generator with a differentiating device is used, FIG. 2 shows a preferred embodiment of a device in accordance with the invention, and FIGS. 3 and 4 show modifications thereof.

In FIG. 1 the rotatably arranged system is denoted by 1, a device for determining the angular velocity of the system, a tachometer generator which generates the initial signal, is denoted by 2, a differentiating device is denoted by 3, an amplifying device by 4 and a torque-generator, a motor, is denoted by 5.

The generator 2 is arranged on a space-oriented basis, which is not shown in the figure, and produces an electric voltage $V_T$ with an amplitude proportion to the angular velocity $d\theta/dt$ of the system 1 in relation to a spaced-fixed direction, i.e., $V_T = k_T \cdot d\theta/dt$ in which $k_T$ is the sensitivity factor of the generator 2.

The voltage $V_T$ is differentiated in the device 3, generating a voltage $V_D = k_D \cdot k_T \cdot d^2\theta/dt^2$, where $k_D$ is the sensitivity factor of the differentiating device 3.

After amplification in the amplifier 4 a voltage $V_F = -k_F \cdot k_T \cdot k_D \cdot d^2\theta/dt^2$ is generated, where $k_F$ is amplification factor of the amplifier and the minus sign indicates that the voltage is 180° out of phase.

With $J$ = the moment of inertia of the rotatably arranged system
$D$ = the damping of the system
$M_M$ = the torque produced in the motor 5
$M_s$ = an external torque the equation of the system is obtained:

$$J\frac{d^2\theta}{dt^2} + D\frac{d\theta}{dt} = M_M + M_s$$

In addition, the following designations are inserted:

$k$ = a moment constant
$I$ = the current in the windings of the motor 5
$E$ = counter E.M.F. in the motor 5
$R_M$ = the resistance of the windings of the motor 5
$k_E$ = the generator constant of the motor 5
$k_M = k/R_M$ = the moment-voltage-constant of the motor 5

The torque produced by the motor is $M_M = k \cdot I$. If the inductance of the motor windings is neglected, the following is given:

$$I = V_F - E/R_M$$

where $$E = k_E \cdot d\theta/dt$$

and $$V_F = -k_T \cdot k_D \cdot k_F \cdot d^2\theta/dt^2$$

The combination of the above equations gives:

$$(J + k_M \cdot k_T \cdot k_D \cdot k_F)\cdot\frac{d^2\theta}{dt^2} + (D + k_E \cdot k_M)\frac{d\theta}{dt} = M_s$$

i.e., on account of the moment introduced by the motor 5 the rotatable system 1 acts as a system with the following moment of inertia:

$$J' = J + k_M \cdot k_T \cdot k_D \cdot k_F$$

For the above analysis it is assumed that the torque introduced by the torque-producing device is fed to the system 1 in such a direction that it counteracts the angular acceleration. By that, an increase is thus obtained of the moment of inertia of the system. However, it may be seen that also a decrease of the moment of inertia can be obtained, if the introduced torque supports the angular acceleration. Of course, the supporting moment of inertia must not exceed the natural moment of inertia of the system.

An embodiment, which is more suitable in practice, is shown in FIG. 2. There the rotatably arranged system is denoted by 21. The system 21 is provided with a platform 22 and is arranged rotatably on a stand 23. On the platform 22 a gyro 24 is arranged with the spin axis of the gyro revolving with one degree of freedom around an axis 25 perpendicular to the axis of rotation of the system 21. The angle of deflection of the gyro, for example in relation to a direction perpendicular to the platform 22, is indicated by means of an angle-determining device 26 and the viscous damping of the gyro is denoted by D. A gyro arrangement made in this way is called an integrating gyro, because by turning the rotatable system 21 with the angular velocity $\omega$ in relation to a space-fixed direction, the gyro 24 makes a deflection proportional to the time-integral of $\omega$, i.e., proportionally to the turning angle of the system.

At small changes of angles in the rotatable system 21 and the gyro 24 a magnitude proportional to the angular acceleration of the system 21 can thus be produced by two derivations following on each other of the magnitude produced by the angle-determining device 26. The voltage from the angle-determining device 26 is then via sliprings 27 fed to an amplifier 28 and a device (not shown in the figure), in which the voltage is differentiated twice for producing a voltage proportional to the angular acceleration of the system 21, which voltage is fed to a torque-producing device, a motor 30.

The device can, however, in a simple way be made independent of the size of the angle changes of the system 21, by the arrangement of a restraining or directional force, which acts between the axis 25 of the gyro and the platform 22. If the restraining is arranged linearly increasing with the deflection angle of the gyro, the magnitude produced by the angle-determining device 26 becomes proportional to the angular velocity of the system 21. The voltage from the angle-determining device 26 needs then only be differentiated once, which happens in the differentiating device 29, after which a voltage is obtained which is proportional to the angular acceleration of the system 21.

The restraining between the axis 25 and the platform 22 can be obtained by means of a resilient member or, as is shown in the figure, by means of a torque motor 31, which by way of sliprings 32 is supplied with the amplified voltage from the device 26.

The invention is, of course, not limited to the embodiments mentioned above, but a number of modifications are possible within the scope of the invention. Thus, by minor alterations, the gyro arrangement shown in FIGURE 2 which is usually called an integrating gyro in velocity coupling and which corresponds to a so-called rate gyro can be made sensitive to the angular acceleration of the system 21, so that the magnitude produced by the device 26 becomes directly proportional to the angular acceleration of the system 21. The differentiating device 29 then becomes superfluous and an integrating device 33 must instead be coupled between the output 28 of the amplifier and the sliprings 32, as shown in FIG. 3, i.e. a voltage is fed back to the motor 31, which voltage after integration is proportional to the angular velocity of the system 21. With such a feed back the gyro arrangement is usually called an integrating gyro in acceleration coupling.

Another possibility to produce a magnitude that is proportional to the angular acceleration of the system 21 consists of exchanging the angle-determining device 26 for an angular-velocity-determining device, i.e. a tachometer generator, at the same time as a linear restraining of the axis 25 is produced by, for example, a resilient member.

If, as in the shown embodiment, the system 21 is made balanced around its axis, a complete correspondence to a balanced fly-wheel is obtained. If a displacement of the center of gravity is introduced in the system, as by a weight 34 connected to the shaft 21 as shown in FIG. 4, the system then acts as a pendulum with a time of oscillation determined by the moment of inertia and the displacement of the center of gravity. Thus the arrangement provides the possibility with small dimensions and small mass to act as a so-called Schuler pendulum, i.e. a pendulum with a time of oscillation of about 84 minutes and acceleration forces affect the system in a way that it is always brought to take a fixed position in relation to the true vertical when moving along the earth's surface.

We claim:
1. A device for producing an artificial moment of inertia in a rotatably mounted body by the application of a torque thereto which comprises
    a gyroscope mounted for one degree of freedom,
    a platform mounted on said rotatable body and rotatable therewith about the body axis,
    means including a fluid damped gyroscope shaft for mounting said gyroscope on said platform with its spinning axis and with said shaft axis perpendicular to each other and to said body axis,
    means, which includes a single differentiating device, responsive to the rotation of said gyroscope about said shaft axis with respect to the plane of said platform for applying a torque proportional to the rate of rotation of said gyroscope about said shaft axis to said rotatable body, and
    means for restraining rotation of said gyroscope shaft with respect to the plane of said platform and which includes a torque motor for applying to said shaft a restraining force proportional to the angular deviation of said gyroscope about said shaft axis from a reference position.

2. A device for producing an artificial moment of inertia in a rotatably mounted body by the application of a torque thereto, which comprises
    a first torque generator acting on said body,
    a gyroscope mounted for one degree of freedom,
    means including a viscous damped gyroscope shaft for mounting said gyroscope on said body with its spin axis and with said shaft axis perpendicular to each other and to the body axis and with said spin axis tiltable about said shaft axis,
    means for restraining tilting of said gyroscope with respect to said body,
        said restraining means including
            an angle sensing device for producing a first signal proportional to the angular deflection of said shaft and
            a second torque generator controlled by said first signal to apply to said shaft a restraining torque proportional to said deflection, and
    means including a single differentiating device for supplying to said first torque generator a second signal proportional to the time differential of the said first signal so as to impart to the body a torque of a magnitude proportional to the angular acceleration of said body in space,
    the signal path between said sensing device and said first torque generator as well as the signal path between said sensing device and said second torque generator comprising
        amplifying means for introducing energy required for operating said torque generators in response to said first and second signals.

3. A device as claimed in claim 2 in which said amplifying means comprise an amplifier having its input connected to siad angle sensing device and its output connected to said differentiating device as well as to said second torque generator.

4. A device for producing an artificial moment of inertia in a rotatably mounted body by the application of a torque thereto, which comprises
    a first torque generator acting on said body,
    a gyroscope mounted for one degree of freedom,
    means including a viscous damped gyroscope shaft for mounting said gyroscope on said body with its spin axis and with said shaft axis perpendicular to each other and to the body axis and with said spin axis tiltable about said shaft axis,
    means for restraining tilting of said gyroscope with respect to said body,
        said restraining means including
            an angle sensing device sensing deflection of the said shaft relative to said body for producing a first signal proportional to said deflection,
            an integrating device for producing a second signal proportional to the time integral of said first signal, and
            a second torque generator controlled by said second signal to apply to said shaft a restraining torque proportional to the time integral of said deflection, and means for supplying to said first torque generator said first signal so as to impart to the body a torque of a magnitude proportional to the angular acceleration of said body in space, the signal path between said sensing device and said first torque generator as well as the signal path between said sensing device and said second torque generator comprising amplifying means for introducing energy required for operating said torque generators in response to said first and second signals.

5. A device as claimed in claim 4 in which said amplifying means comprise an amplifier having its input connected to said angle sensing device and its output connected to said integrating device as well as to said first torque generator.

6. A device for indicating the true vertical on vehicles movable along or above the surface of the earth, said device including a pendulum rotatably mounted about an axis in relation to the vehicle, acceleration sensing means responsive to the angular acceleration of the pendulum about the pendulum axis in relation to the inertial space for generating a signal representing said angular acceleration, torque generating means responsive to said signal for imparting to said pendulum a torque proportional to said angular acceleration in a sense opposite to the torque causing said angular acceleration, whereby said acceleration sensing means and said torque generating means act to impart to the pendulum an artifically increased moment of inertia, said acceleration sensing means and said torque generating means being dimensioned so as to give rise to a total moment of inertia of the pendulum for causing the same to have a time of oscillation sufficiently long to maintain a substantially unchanged angular position in its plane of rotation in relation to the true vertical under the influence of acceleration forces acting on the pendulum as a result of the movements of the vehicle along or above the surface of the earth.

7. A device as claimed in claim 6 in which said acceleration sensing means comprise a gyroscope mounted for one degree of freedom, means including a viscous damped gyroscope shaft for mounting said gyroscope on said pendulum with its spin axis and with said shaft axis perpendicular to each other and to the pendulum axis and with said spin axis tiltable about said shaft axis, means for restraining tilting of said gyroscope with respect to said pendulum, said restraining means including an angle sensing device sensing deflection of the said shaft relative to said pendulum for producing a first signal proportional to said deflection, and a torque generator controlled by said first signal to apply to said shaft a restraining torque proportional to said first signal, means including a single differentiating device for supplying to said torque generating means a second signal proportional to the differential of the said first signal, for imparting to said pendulum a torque proportional to said angular acceleration, the signal path between the said sensing device and said torque generator as well as the signal path between said sensing device and said torque generating means comprising amplifying means for introducing energy required for operating said torque generating means and said torque generator in response to said first and second signals.

8. A device as claimed in claim 7 in which said amplifying means comprise an amplifier having its input connected to said angle sensing device and its output connected to said differentiating device as well as to said torque generator.

9. A device as claimed in claim 6 in which said acceleration sensing means comprise a gyroscope mounted for one degree of freedom, means including a viscous damped gyroscope shaft for mounting said gyroscope on said pendulum with its spin axis and with said shaft axis perpendicular to each other and to the pendulum axis and with said spin axis tiltable about said shaft axis, means for restraining tilting of said gyroscope with respect to a reference plane of said pendulum, said restraining means including an angle sensing device sensing deflection of the said shaft relative to said reference plane for producing a first signal proportional to said deflection, an integrating device for producing a second signal proportional to the time integral of said first signal, and a torque generator controlled by said second signal to apply to said shaft a restraining torque proportional to the said second signal, and means for supplying to said torque generating means said first signal for imparting to said pendulum a torque proportional to said first signal, the signal path between the said sensing device and said torque generating means as well as the signal path between said sensing device and said torque generator comprising amplifying means for introducing energy required for operating said torque generating means and said torque generator in response to said first and second signals.

10. A device as claimed in claim 9 in which said amplifying means comprise an amplifier having its input connected to said angle sensing device and its output connected to said integrating device as well as to said torque generating means.

11. A device for producing an artificial moment of inertia in a rotatably mounted body by the application of a torque thereto, which comprises sensing means sensing the angular acceleration of said body in the inertial space about the body axis and generating a signal representing the said angular acceleration, said sensing and signal generating means including an initiating signal generator and an amplifying means, and a torque generator operatively connected to the output of said amplifying means and acting on said body around said body axis and responsive to said signal to produce a torque proportional to said angular acceleration.

References Cited by the Examiner

UNITED STATES PATENTS

| | | | |
|---|---|---|---|
| 1,880,994 | 10/1932 | Sperry | 74—5.4 X |
| 2,752,790 | 7/1956 | Draper | 74—5.4 |
| 2,752,793 | 7/1956 | Draper et al. | 74—5.34 |
| 2,811,043 | 10/1957 | Bonnell | 74—5.34 |
| 2,841,751 | 7/1958 | Newman | 74—5.6 X |
| 2,893,247 | 7/1959 | Stern et al. | 74—5.6 |
| 2,893,248 | 7/1959 | Ecary | 74—5.4 X |
| 2,898,766 | 8/1959 | Pittman | 74—5.34 |
| 2,925,736 | 2/1960 | Mueller | 74—5.6 |
| 2,942,475 | 6/1960 | Johnson | 74—5.6 X |
| 2,961,877 | 11/1960 | Edwards | 74—5.34 X |

FRED C. MATTERN, Jr., *Primary Examier.*

SAMUEL SPINTMAN, BROUGHTON G. DURHAM, *Examiners.*

T. W. SHEAR, P. W. SULLIVAN, *Assistant Examiners.*